(12) United States Patent
Stocker et al.

(10) Patent No.: US 10,136,323 B2
(45) Date of Patent: Nov. 20, 2018

(54) METHOD AND DEVICE FOR OPERATING A MOBILE TERMINAL IN A MOBILE COMMUNICATION NETWORK

(71) Applicant: GIESECKE & DEVRIENT GMBH, Munchen (DE)

(72) Inventors: Thomas Stocker, München (DE); Monika Eckardt, Mammendorf (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/303,428

(22) PCT Filed: Apr. 16, 2015

(86) PCT No.: PCT/EP2015/000801
§ 371 (c)(1),
(2) Date: Oct. 11, 2016

(87) PCT Pub. No.: WO2015/158434
PCT Pub. Date: Oct. 22, 2015

(65) Prior Publication Data
US 2017/0034705 A1     Feb. 2, 2017

(30) Foreign Application Priority Data
Apr. 16, 2014   (DE) .................. 10 2014 005 566

(51) Int. Cl.
*H04M 1/66*      (2006.01)
*H04W 12/08*     (2009.01)
(Continued)

(52) U.S. Cl.
CPC ............ *H04W 12/08* (2013.01); *H04L 63/08* (2013.01); *H04L 63/126* (2013.01); *H04W 4/50* (2018.02);
(Continued)

(58) Field of Classification Search
CPC ..... H04W 12/08; H04W 4/001; H04W 4/003; H04W 4/005; H04W 8/183; H04W 12/04;
(Continued)

(56) References Cited

U.S. PATENT DOCUMENTS

2005/0164737 A1* 7/2005 Brown .................. H04W 8/245
                                                          455/558
2012/0282924 A1* 11/2012 Tagg ....................... H04W 8/04
                                                          455/432.1
(Continued)

FOREIGN PATENT DOCUMENTS

EP      1239687 A1    9/2002
EP      2448215 A1    5/2012
(Continued)

OTHER PUBLICATIONS

German Search Report for corresponding German Application No. 102014005566.3, dated Nov. 25, 2014.
(Continued)

*Primary Examiner* — Barry W Taylor
(74) *Attorney, Agent, or Firm* — Workman Nydegger

(57) ABSTRACT

A method is provided for operating a security module of a mobile terminal, and a security module. The security module is developed to communicate over one of a plurality of mobile communication networks. The security module comprises different system configurations for different mobile communication networks of the plurality of mobile communication networks. The security module receives subscription data for logging into one mobile communication network of the plurality of mobile communication networks, analyzes the subscription data, and identifies the mobile communication network out of the plurality of mobile communication networks. Subsequently, the security module selects a system configuration in accordance with the mobile communication network, identified in the preceding (Continued)

step, of the plurality of mobile communication networks. The security module is operated with the selected system configuration in the identified mobile communication network.

20 Claims, 3 Drawing Sheets

(51) Int. Cl.
| | |
|---|---|
| *H04W 4/70* | (2018.01) |
| *H04W 76/10* | (2018.01) |
| *H04W 4/50* | (2018.01) |
| *H04W 4/60* | (2018.01) |
| *H04W 8/18* | (2009.01) |
| *H04W 12/04* | (2009.01) |
| *H04L 29/06* | (2006.01) |
| *H04W 48/02* | (2009.01) |
| *H04W 48/16* | (2009.01) |
| *H04W 48/18* | (2009.01) |

(52) U.S. Cl.
CPC ............... *H04W 4/60* (2018.02); *H04W 4/70* (2018.02); *H04W 8/183* (2013.01); *H04W 12/04* (2013.01); *H04W 48/02* (2013.01); *H04W 48/16* (2013.01); *H04W 48/18* (2013.01); *H04W 76/10* (2018.02)

(58) Field of Classification Search
CPC ..... H04W 48/02; H04W 48/16; H04W 48/18; H04W 76/02; H04W 8/205; H04L 63/08; H04L 63/126; G06F 9/45504
See application file for complete search history.

(56) References Cited

U.S. PATENT DOCUMENTS

| | | |
|---|---|---|
| 2013/0023235 A1 | 1/2013 | Fan et al. |
| 2013/0227646 A1 | 8/2013 | Haggerty et al. |
| 2013/0231087 A1 | 9/2013 | O'Leary |
| 2013/0340059 A1 | 12/2013 | Christopher et al. |
| 2014/0038563 A1 | 2/2014 | O'Leary |
| 2014/0040988 A1* | 2/2014 | Nozulak ............... H04W 4/001 726/3 |
| 2014/0073375 A1* | 3/2014 | Li ......................... H04W 4/001 455/558 |
| 2014/0308991 A1 | 10/2014 | Lee et al. |

FOREIGN PATENT DOCUMENTS

| | | |
|---|---|---|
| EP | 2530960 A1 | 12/2012 |
| WO | 2013066077 A1 | 5/2013 |

OTHER PUBLICATIONS

International Search Report for corresponding International PCT Application No. PCT/EP2015/000801, dated Jul. 16, 2015.
Extended European Search Report from EP Application No. 15718141.3, dated Dec. 18, 2017.

* cited by examiner

METHOD AND DEVICE FOR OPERATING A MOBILE TERMINAL IN A MOBILE COMMUNICATION NETWORK

FIELD OF THE INVENTION

The present invention relates to communication over mobile communication networks in general. In particular, the present invention relates to a method and a device for operating a mobile terminal in a mobile communication network by means of a security module to communicate over one of a plurality of mobile communication networks.

BACKGROUND OF THE INVENTION

For communication with a mobile terminal, for example a mobile telephone, over a mobile communication network that is operated by a network operator, it is normally required that the mobile terminal be designed having a security element for securely storing data. Said data serves the clear identification of the user of the mobile terminal vis-à-vis the mobile communication network. For example, in a mobile terminal that is developed to communicate according to the GSM (global system for mobile communications) standard, which is currently one of the most widespread mobile communication standards, a security element having the name SIM (subscriber identity module) is commonly used in the form of a chip card or smart card. According to the GSM standard, whose technical features are defined in a plurality of interlinked and interdependent specifications, the SIM card receives subscriber identification data or subscription credentials for identifying and authenticating the user or the subscriber, including an IMSI (international mobile subscriber identity; a number for the clear (internal) identification of network subscribers) and an authentication key. Before a subscriber is issued his SIM card, said subscription credentials are commonly securely stored on the SIM card by the SIM card manufacturer or the network operator in the context of a personalization process as part of a subscription profile. A non-personalized SIM card is generally not suitable for proper use in a mobile terminal. This means that services provided by a mobile communication network cannot be accessed with a non-personalized SIM card without a subscription profile.

One particular area of application of security elements, such as SIM cards, UICCs, eUICCs and the like, that in all probability will grow considerably in the near future is M2M (machine to machine) communication. An M2M communication is understood to be the communication between machines over a mobile communication network without human interaction. Here, data can be automatically exchanged between numerous different machine types that are developed having a security element in the form of an M2M module, for example TV systems, set-top boxes, vending machines, vehicles, traffic lights, surveillance cameras, sensor and control devices, and the like. It is foreseeable that, at least with some such devices, it will be impossible or at least very difficult to provide the security element with a subscription profile already at manufacture. This is due especially to the fact that, in many M2M devices, the security element is implemented in the form of a surface-mounted chip or chip module. At this time, however, it is not clear, for example, in which country a certain M2M device will be used. Consequently, with such M2M devices having non-personalized security elements, it is essential that said devices be capable of being provided with a subscription profile over the air interface only once they are used in the field.

For the utilization of the services provided by a mobile network operator, especially communication over the appropriate mobile communication network, the user of a mobile terminal must normally pay a monthly fee. If the user would like to switch to another mobile network operator, for example because of lower monthly fees and/or other services and/or use of the mobile terminal in another location, the user himself must commonly replace the SIM card (security module) having the existing subscription profile, provided by the existing mobile network operator for use of the mobile communication network of the existing mobile network operator, with a SIM card having a new subscription profile, provided by the new mobile network operator for use of the mobile communication network of the new mobile network operator. Instead of said conventional approach, it would, without question, be easier and more convenient for the user to have a security element that can be reprogrammed with a new subscription profile over the air interface.

Methods are already known from the background art for downloading a subscription profile from a server instance over an air interface to a security element on which a subscription profile is already present. After downloading the new subscription profile, a switch from the already existing subscription profile to the new subscription profile is carried out by the security element. However, due to the mobile use of the security module in the mobile terminal, especially in an M2M device, the problem may occur that messages from the server instance over the air interface to the security element go missing. Further, to load a subscription over the air interface, an already established connection of the M2M device with a mobile communication network using an already loaded subscription is required. However, it is unlikely that the use of the already loaded subscription will be accepted by every other mobile communication network provider. Without prior registration in the new mobile communication network, no new subscription can be loaded.

A security element that is provided with multiple subscription profiles for a plurality of mobile communication networks provides one solution to this problem. Each of said subscription profiles is closed off from each other such that, when one subscription profile is in operation, another subscription profile is not accessible. In particular, for usage in M2M devices used internationally, this means holding a nearly infinite number of subscription profiles. To save memory space, the subscription profiles are limited to a number of particular mobile network operators.

The structure and the content of the plurality of subscription profiles are very different, such that a switch of subscription profiles affects only standardized content. Network-operator-specific functions and content, for example encryption algorithms or roaming data, are not supported by subscription management.

Against this background, the object that poses itself to the present invention is to provide an improved method and a device with which the problems of the background art will be solved. In particular, easier management of subscription profiles is to be facilitated.

SUMMARY OF THE INVENTION

The above object is solved by the respective subject of the independent claims. Preferred embodiments of the present invention are defined in the dependent claims.

According to a first aspect of the present invention, a method for operating a security module of a mobile terminal is provided. A subscription profile comprises subscription data and a system configuration. The system configuration comprises exclusively network-specific system configurations that comprise proprietary characteristics, parameters and/or algorithms for logging the security module into a mobile communication network and for operating it therein. This means that there is included in the system configuration data that is to be handled with particular sensitivity. Third parties, especially other mobile network operators, cannot access or modify said data. The security module comprises different system configurations for different mobile communication networks.

The subscription data includes, for instance, identification data for the user of the mobile telephone to identify himself vis-à-vis the mobile communication network upon logging in. Said identification data can and, to some extent, should be available to other mobile communication networks, especially for roaming. The subscription data can preferably be loaded, especially updated, by a service provider, for instance a subscription manager, or to the mobile communication network provider, over an air interface. Further, during the login process into a mobile communication network, said data can be modified by said network, especially be updated by a new download. For this, a data equalization could take place with an HLR (the "home location register" of a mobile number).

The security module receives, in a first step, subscription data for logging into a mobile communication network of a plurality of mobile communication networks. The subscription data is preferably transmitted to the security module over an air interface from a subscription manager or the provider of the mobile communication network for which the subscription data is specified. The security module analyzes the subscription data and identifies the mobile communication network of the plurality of mobile communication networks into which the security module can log by means of the subscription data.

After selecting and identifying the mobile communication network, the security module selects a system configuration in accordance with the subscription data or the identified mobile communication network. The mobile terminal can log in to the mobile communication network with the subscription data and the system configuration. Further, the security module will be operated in the identified mobile communication network with the selected system configuration.

One security element according to the present invention is, for example, a data carrier developed in hardware. The security element is arranged, for example, in a terminal as a firmly integrated component, it being either not possible to remove it from the terminal in that form, for instance as a subscriber identification module, M2M module, co-processor, trusted base, trusted platform, or module. Alternatively, the security element is connected with the mobile terminal as a removable module, for example as a chip card, especially as a subscriber identification module, smart card, mass storage card, USB token, multimedia card, secure micro SD card, mobile communication network token, for example a UMTS USB modem, and/or as an electronic identification document, for example as an electronic identity card or passport having stored in a memory area machine-readable identification units of a person.

According to a further alternative, the security element can be developed as a combination of hardware and software components in a trusted area of an operating system of the mobile terminal, known to the person of skill in the art as a "trusted execution environment" (TEE). The security element can thus be developed within such a trusted execution environment in the form of programs running therein, so-called Trustlets®. The security module can, in principle, be a computer that is reduced in size and scope of resources and that comprises a processor and at least one interface for communicating with an external device. It frequently has only a rudimentary user data output of its own, or none at all. The security module comprises especially a data memory for storing data, information, files and/or applications with associated variables, with regions of the data memory being able to be volatile or non-volatile. The non-volatile data memory can especially be permanent, for example a read-only memory, abbreviated ROM, or semi-permanent, for example designed as an electrically erasable programmable read-only memory, abbreviated EEPROM, flash memory, ferroelectric random access memory, abbreviated FRAM or FeRAM memory, or magnetoresistive random access memory, abbreviated MRAM memory.

The selection of the mobile communication network into which is to be logged can be made by the user. For this, the user can be presented with a list with possible mobile communication networks that are available and/or that are permitted for login. The user can subsequently select a desired mobile communication network.

Alternatively, the selection of the mobile communication network to be logged in to from the plurality of mobile communication networks can occur automatically. For this, a priority list could be stored in the mobile terminal and/or in the security module. Listed in the priority list is a rank sequence of mobile communication networks for which logging in is possible and permitted. Furthermore, there can be stored in the security module a selection algorithm in which additional information, for example local information of the mobile communication network or current position information of the security module, and/or availability forecasts can be included in the selection of the mobile communication network.

The different subscription data preferably comprise identification data and general operating data regarding the respective mobile communication network. For example, the subscription data comprises a unique identification number of the security module and/or of the user, for example an IMSI (International Mobile Subscriber Identity), or a telephone number (MSISDN, Mobile Station Integrated Services Digital Network Number), an authentication key ($K_i$), an identification key, a network operator name, a string information, information on the composition of the file structure and/or a compilation of applications. Especially authentication algorithms, roaming data, information on remote file management, special operating data, for example transmission methods for payment transactions, special server addresses and/or serial numbers or license keys may be considered as the system configuration.

While it is, in principle, possible for subscription data to be updated by the respective mobile communication network or an operator of the mobile communication network, or a subscription manager, the system configuration is not directly modifiable and preferably not modifiable.

The system configuration is preferably implemented in the operating system. Depending on the security requirements for a piece of data, said data can also be outsourced, for example by means of a link to a library, it being possible to load the library subsequently. The system configuration preferably comprises a system configuration identification with which, for example, the operating system or a switching unit that can be implemented in the operating system can establish a mapping from the system configuration to a mobile communication network or a subscription profile.

In this way, when manufacturing a security module, especially proprietary functions or mobile-communication-network-specific configurations for one mobile communication network each of a plurality of mobile communication networks can be stored on the security module. To log in to the identified mobile communication network, the operating system automatically selects the system configuration mapped to the identified mobile communication network. In this way, the security module is suitable for communicating over one of a plurality of mobile communication networks. In particular, when used with an M2M module, for example in a vehicle, a security module can be manufactured that is suitable for logging in to and for operating a large number of mobile communication networks in different countries. The security module selects for a certain mobile communication network, for example one selected by the user, a system configuration that is suitable therefor. The manufacturer can thus equip the security module in an M2M module with special functions in connection with certain mobile communication networks. In particular, special rules on data communication can be regulated. Depending on the country and mobile communication network provider, the security module selects an appropriate subscription profile.

Further, the method according to the present invention makes it possible, for example, for the security module not to have to be replaced or elaborately reconfigured when transported abroad. Moreover, the user is not obligated to make use of roaming functions during extended use abroad. Rather, it is now possible for the user, as a contractual partner of a mobile network operator, to log in to its mobile communication network without prior loading of complete subscription profiles. Further, with the present invention, the functionality of the security module is improved with a view to the plurality of mobile communication networks, and memory space is saved at the same time.

The system configuration preferably provides settings for the communication of the security module and/or of the mobile terminal with a mobile communication network. In this way, as already mentioned, proprietary settings, for instance algorithms for authenticating the user or the security module vis-à-vis a mobile communication network, are provided by the system configuration. Further, due to the system configuration, keys and/or codes for securely transmitting data between the mobile telephone or the security module and the mobile communication network can be included.

The system configuration can influence a function of the security module and/or of the mobile terminal. In particular, there could be listed in the system configuration, for example, rules on data communication for payment processes. This could comprise, for instance, an encryption of data entered or received, security settings for using the mobile communication network and/or a further network, and/or a selection of addresses to be used for communication. In this way, it would be possible, for example, for payment transactions to be possible only vis-à-vis certain financial service providers for the security of the user and/or of the operator of a mobile communication network. Accordingly, an entry is included in the system configuration. From the system configuration data, the mobile terminal could detect certain settings and activate or block functions accordingly. In this way, the mobile terminal, for example, could detect from the system configuration whether a payment transaction by means of a credit card connected over NFC is possible and/or permitted. If the mobile terminal detects that the function is not provided and/or is excluded in said mobile communication network, then the mobile terminal could, during a payment transaction, deactivate or not permit the NFC functionality.

After the security module has identified the mobile communication network that is to be logged in to, to select the system configuration, a unit can preferably be addressed to activate and/or deactivate system configurations. Said unit for activating and/or deactivating activates a system configuration in accordance with the identified mobile communication network such that the mobile terminal can log in to and be operated in the identified mobile communication network. The unit for activation and/or deactivation can be, for example, a switching unit. The unit for activation and/or deactivation is preferably implemented in the operating system of the security module or a portion of the operating system. Alternatively, the unit for activation and/or deactivation can be an application and preferably be executed in a secure environment of the security module or of the operating system.

To activate the system configuration, the selecting unit can have the function of a runtime switch, for example by establishing a link. This means that, during the runtime of the security module, a system configuration that is compatible with the subscription data or the identified mobile communication network is selected from the plurality of system configurations and activated or switched on. If the mobile terminal logs out of one mobile communication network of the plurality of mobile communication networks, for example when the mobile network operator or the mobile communication network is switched, then the system configuration that was valid and activated up to that point will be deactivated. This prevents two system configurations for two different mobile communication networks from being active simultaneously.

Further, it can be provided that an inactive system configuration is present encrypted and/or zipped, or especially is grouped thematically. Accordingly, the operating system and/or an application can comprise a function with which, upon logging out of a mobile communication network, the previously valid system configuration is not only deactivated, but also encrypted and/or zipped and/or grouped. Especially the unit for activating the system configuration, the operating system and/or an application could, after a system configuration is selected, accordingly decrypt, merge and/or unzip the system configuration and/or portions of the system configuration to log into a mobile communication network and/or to operate the mobile terminal in the mobile communication network. Further, it can also be provided that, after a system configuration switch, the previous one is at least partially deleted. The content to be deleted is preferably an authentication or encryption algorithm.

Further, the object mentioned above is solved by a security module for use in a mobile terminal. The security module comprises a memory, the memory being developed for storing subscription profiles. The subscription profiles are developed for logging into one mobile communication network of a plurality of mobile communication networks. A subscription profile comprises subscription data and a system configuration. A system configuration comprises exclusively network-specific data that comprises proprietary characteristics, parameters and/or algorithms for logging the security module into a mobile communication network and for operating it therein. This means that particularly sensitive data is included in the system configurations. Third parties, especially other mobile network operators, cannot access or modify said data. The subscription data includes, for instance, identification data for the user of the mobile telephone to identify himself vis-à-vis the mobile communication network when logging in. Said identification data can and, to some extent, should be available to other mobile communication networks, especially for roaming. The subscription data can preferably be loaded, especially updated, by a service provider, for instance a subscription manager, or to the mobile communication network provider, over an air interface. Further, during the login process into a mobile communication network, said data can be modified by said network, especially be updated by downloading it anew. For this, a data equalization could take place with an HLR (the "home location register" of a mobile number). Different system configurations can be stored in the memory without associated subscription data being stored in the memory.

The security module comprises an analyzing unit for analyzing the subscription data for one mobile communication network of the plurality of mobile communication networks the security module can log in to. Further, the security module comprises a selecting unit for selecting the system configuration in accordance with the subscription data of the mobile communication network the security module can log in to by means of the subscription data. The memory for storing the system configuration is preferably developed as a secure memory, the secure memory being able to be part of the memory. In this way, it can be ensured that no unauthorized third party can access and/or edit content in the system configuration. In particular, it is to be prevented that a mobile network operator can access and edit content in a system configuration of another mobile network operator. In particular, it can be provided that the system configurations are present separate from each other and are thus closed off from each other.

In one embodiment, it can be provided that the unit for activating a system configuration is active for a certain runtime. The system configuration is thus valid only for a certain period. After the time expires, the system configuration is deactivated again and the operation of, for example, a mobile terminal in the identified mobile communication network would no longer be possible with said system configuration. An issuer of the security module, but also an issuer of the system configuration, could exert influence on the operating period of the security module, for example by means of subsequently loadable operating parameters in a certain mobile communication network, and extend the runtime. Further, as the issuer of the security module, a mobile network operator could make a temporary use of other mobile communication networks possible for a user.

Further, it can be provided that a system configuration is developed in the memory of the security module as a basic configuration. The basic configuration can be used by the security module in connection with a mobile communication network for which no system configuration is present. Thus, the security module and/or the mobile terminal can be prepared and set for use by, for example, services of an as yet unknown mobile communication network. In particular, rules for transmitting data concerning M2M communication could be listed in the basic configuration.

In one embodiment, it can be provided that at least a portion of a system configuration is stored in a memory that is usable and accessible for other system configurations. Said memory that is accessible and usable for other system configurations, a so-called "common region," enables simple management of parameters and settings of the system configuration. Further, in this way, operating data can be provided across mobile communication networks. To use the common region, a link or a pointer to the common region could be set in the actual system configuration for a mobile communication network.

BRIEF DESCRIPTION OF THE DRAWINGS

Further features and advantages of the present invention are evident from the following description of different exemplary embodiments and alternatives according to the present invention, in connection with the figures. Shown are.

DETAILED DESCRIPTION OF VARIOUS EMBODIMENTS

Figure 1:
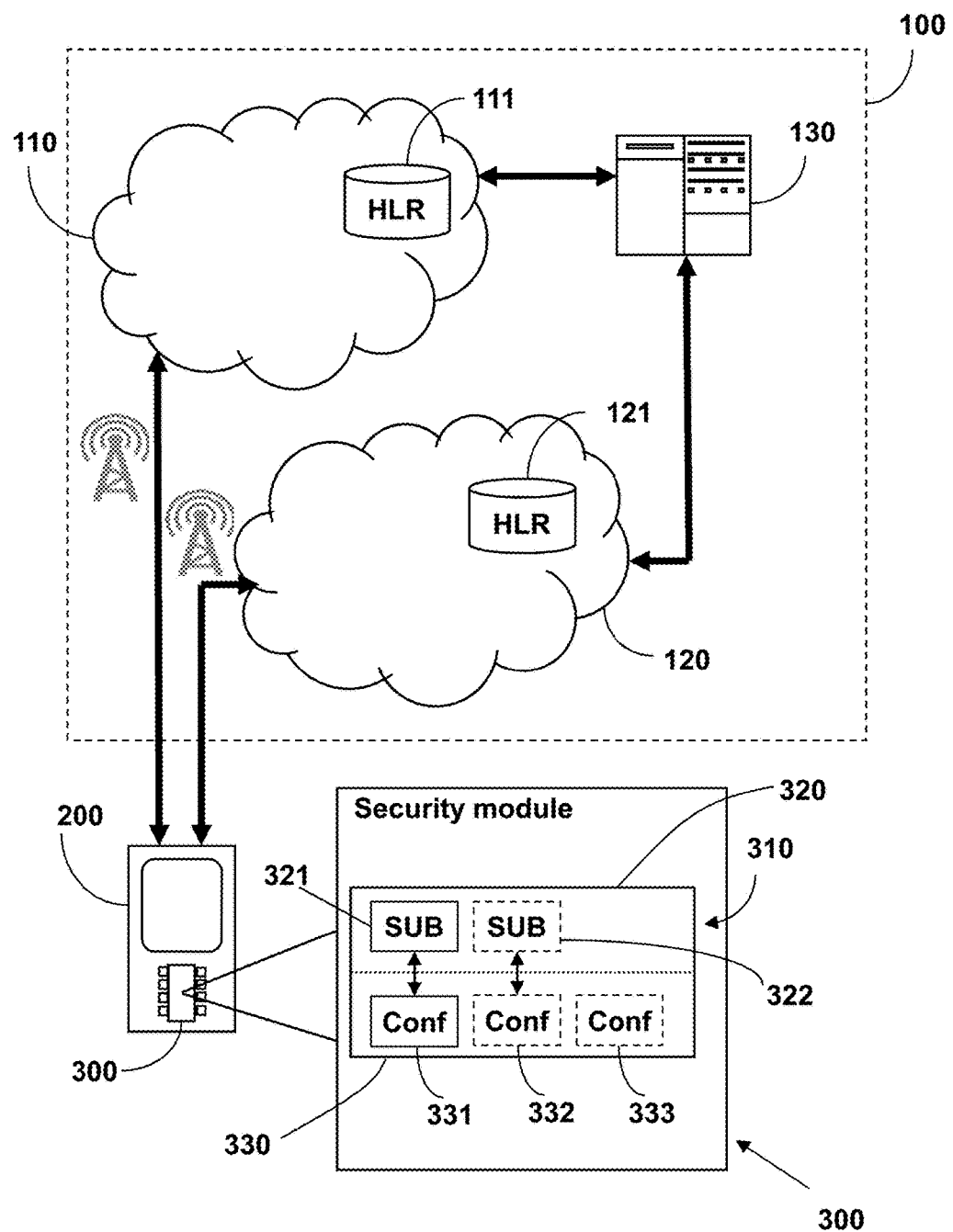
FIG. 1 a first schematic diagram of a communication network.

In FIG. 1 is depicted a schematic diagram of a communication system 100 according to the present invention. A mobile telephone 200 comprises a security module 300. The security module 300 comprises a memory 310. The memory 310 comprises a subscription data memory 320 for storing first subscription data 321 and second subscription data 322. Further, the security module 300 comprises, in the memory 310, a system configuration memory 330. In the system configuration memory 330 is stored a first system configuration 331, a second system configuration 332 and a third system configuration 333. The first system configuration 331 is mapped to a first mobile communication network 110, the second system configuration 332 is mapped to a second mobile communication network 120, and the third system configuration 333 is not mapped to a specific mobile communication network. In this exemplary embodiment, the third system configuration 333 is to be understood as a basic system configuration. Included in the first or second system configuration 331, 332 is, in each case, mobile-communication-network-specific, normally unchanging information that is required for logging into the mobile communication network and for the operation of the security module 300 and/or of the mobile telephone 200 in the first or second mobile communication network 110, 120. In particular, an authentication algorithm, roaming data, language codes, transmission channels and/or serial numbers may be considered here.

The first and second subscription data 321, 322 comprise data that is required for logging in to the first or second mobile communication network 110, 120. The subscription data 321, 322 is provided, at least in part, by the operator of the first or second mobile communication network 110, 120. In particular, the first and second subscription data 321, 322 each includes a network key, an IMSI for uniquely identifying a mobile communication subscriber, and/or the mobile number (MSISDN).

The first and second mobile communication network 110, 120 each comprise an HLR (home location register) 111, 121. The HLR 111, 121 is a primary database of the operator, in which information for the registration or authentication of the mobile communication subscriber is stored.

If the user of the mobile telephone 200 would like to log in to a mobile communication network, the user of the mobile telephone 200 selects the first mobile communication network 110 or second mobile communication network 120. In the present case, the user selects the first mobile communication network 110. The mobile telephone 200 and the security module 300 receive subscription data for the first mobile communication network 110. Said subscription data is stored in the security module 300 as first subscription data 321. Thereafter, the security module 300 analyzes the first subscription data 321 and detects from the first subscription data 321 that the first mobile communication network 110 should be logged in to and the security module 300 and mobile telephone 200 should be operated in the first mobile communication network 110. In other words: the security module 300 detects, based on the first subscription data 321, that the first subscription data 321 enables logging in to the first mobile communication network 110, for example in that the name of the operator of the first mobile communication network 110 is stored in the first subscription data 321. The security module 300 selects the first system configuration 331 accordingly as a complement to the first subscription data 321. From the system configuration 331, the security module 300 receives, for example, an authentication algorithm, such that the security module 300, for example in conjunction with the network key, can authenticate itself vis-à-vis the first mobile communication network 110 and log in thereto.

If the user of the mobile telephone 200 would like to switch from the first mobile communication network 110 to the second mobile communication network 120, for example due to crossing a border, then the mobile telephone 200 must log out of the first mobile communication network 110 and log in to the second mobile communication network 120. For this, the security module 300 receives subscription data from the second mobile communication network 120 and updates the second subscription data 322 therewith. The security module 300 preferably searches for subscription data that is already available for the second mobile communication network 120. If there is such data already stored for the second mobile communication network 120, said stored subscription data is preferably deleted and the new subscription data stored. If no subscription data is yet stored for the second mobile communication network 120, free memory space is sought and it is stored there. Alternatively, other subscription data could be deleted and the memory space freed up in this way used for storing the subscription data of the second mobile communication network 120. In the present case, subscription data for the second mobile communication network 120 is stored in free memory space as second subscription data 332. With the switch from the first mobile communication network 110 to the second mobile communication network 120, the security module 300 analyzes the second subscription data 332. Based on the result of the analysis, the security module 300 detects that the second system configuration 331 is to be used for logging the security module 300 in to the second mobile communication network and for operating the security module 300 therein. Accordingly, the security module 300 switches from the first system configuration 331 to the second system configuration 332.

Both the second subscription data 322 and the second system configuration 332 include information for logging the mobile telephone 200 and the security module 300 in to the second mobile communication network 120 and operating them therein. Additional parameters, for example an authentication algorithm or roaming data, are provided through the second system configuration 332.

Subscription data relating to the first mobile communication network 110, the second mobile communication network 120 and/or a further mobile communication network can be provided from a subscription server 130 of a subscription manager and transmitted to the security module 300. For example, an update relating to the first subscription data 321 could be loaded to the security module 300 from the subscription server 130.

The first and second subscription data 321, 322 are stored in the subscription data memory 320 in the memory 310 of the security module 300. First, second and third system configurations 331, 332, 333 are stored in the system configuration memory 330. Here, the first subscription data 321 and the first system configuration 331 form a first subscription profile, and the second subscription data 322 and the second system configuration 332, a second subscription profile. The third system configuration 333 is a basic configuration 333. In the basic configuration 333 are listed settings, for example with respect to the serial number of the security module 300 or fundamental parameters for data transmission, for example values of operating states of machines for M2M communication, to foreign and as yet unknown mobile communication networks.

If a user of the mobile telephone 200 would now like to log in, by means of the mobile telephone 200, to a mobile communication network unknown to the security module 300, then the security module 300 could download subscription data relating to the unknown new mobile communication network from a subscription server 130 and, with the aid of the newly loaded subscription data and the system configuration 333, log in to the new mobile communication network.

Figure 2:
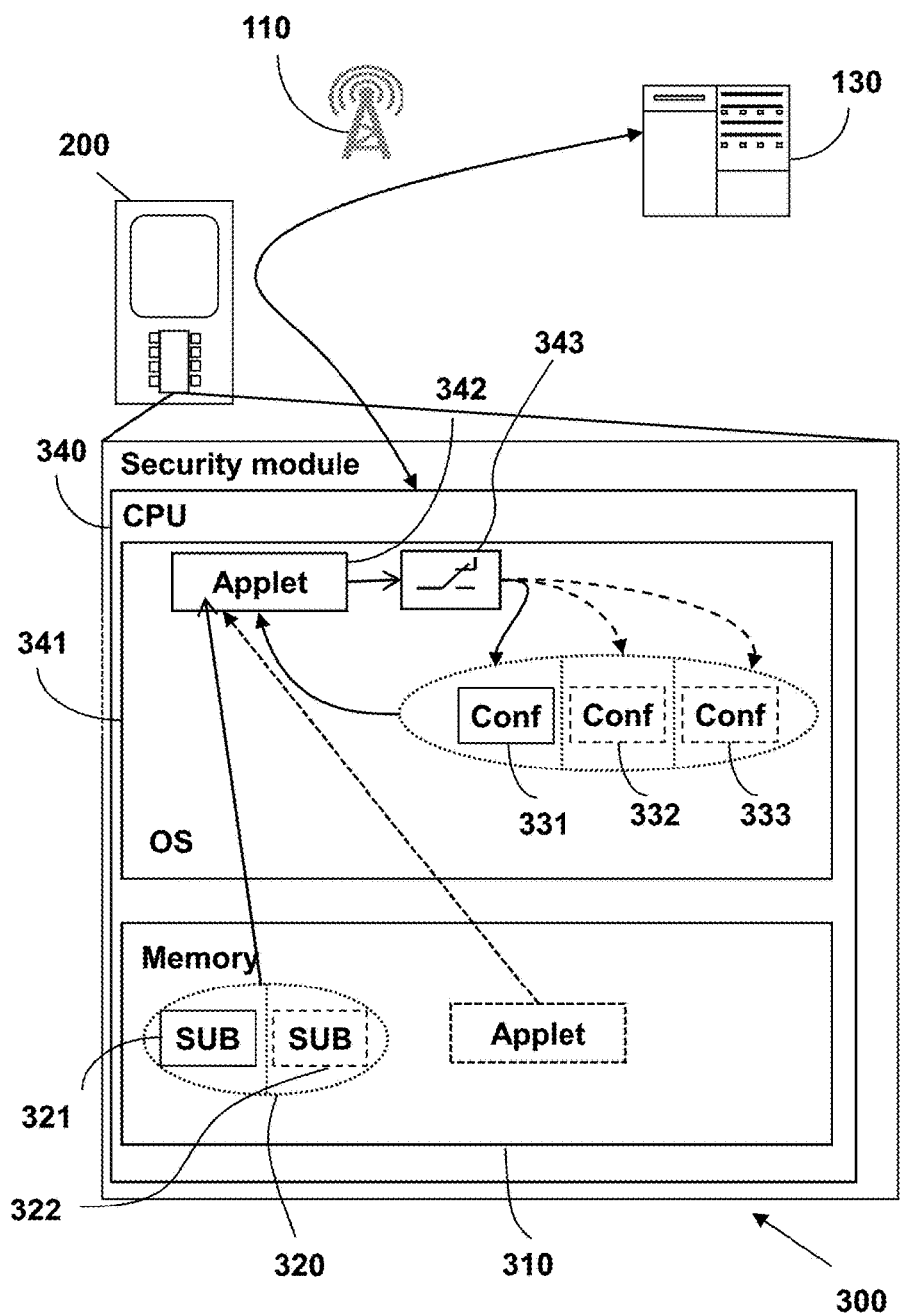
FIG. 2 a further schematic diagram of a communication network using a security module according to the present invention.

In FIG. 2 is depicted a further schematic diagram of the present invention with a view to the security module 300. The embodiment in FIG. 2 is similar to the embodiment in FIG. 1, but the relationships or the structure in the security module 300 are addressed in greater detail. A mobile terminal 200 in the form of a mobile telephone 200 comprises a security module 300. The security module 300 comprises a central computing unit 340 (CPU) having an operating system 341 (OS) and a memory 310. Present in the memory 310 is a subscription data memory 320 having a memory space for first subscription data 321 and second subscription data 322. In contrast to the structure according to FIG. 1, included in the operating system 341 are a first system configuration 331, a second system configuration 332 and a basic configuration 333. The first system configuration 331 comprises specific configurations with respect to a first mobile communication network 110, and the second system configuration 332 has specific configurations with respect to a second mobile communication network 120. The basic configuration 333, in contrast, comprises data for a standard-conform configuration of further mobile communication networks. The security module 300 receives, over the mobile telephone 200, subscription data relating to the first mobile communication network 110 for logging a mobile telephone 200 and/or security module 300 in to the first mobile communication network 110 and operating them therein. The subscription data received is stored as subscription data having the contents of the first subscription data 321. Thereafter, the first subscription data 321 is selected in accordance with the first mobile communication network as subscription data that is to be used further. The operating system 341 analyzes the first subscription data through an analyzing unit integrated in the operating system 341 and identifies the first mobile communication network 110 as a mobile communication network that is to be logged in to. Alternatively, the analyzing unit can be provided as a standalone application or in connection with another application.

Thereafter, an application 342, as the selecting unit of the operating system 341, specifies the first system configuration 331 matching the identified first mobile communication network 110. To activate the first system configuration 331, the application 342 instructs a switching unit 343 to activate the first system configuration 331. At the same time, the second system configuration 332 and basic configuration 333 are deactivated by the switching unit 343. In principle, the switching unit 343 could be integrated in the application 342 and/or be a component of the operating system 341.

While the first system configuration is activated, the second system configuration 332 and basic configuration 333 are each hidden and protected against access by third parties. In particular, it is to be prevented that the information stored in the second system configuration 332 and in the basic configuration 333 can be accessed by the mobile telephone 200 or the first mobile network operator. The application 342 and the switching unit 343 are executed in a secure environment of the security module or of the operating system 341 and can, accordingly, be provided as Trustlets®. While the first and second subscription data 321, 322 can be modified and/or overwritten by a mobile network operator or a subscription manager, after manufacturing the security module 300, it is nearly impossible to modify the first system configuration 331, second system configuration 332 and/or basic configuration 333. Such a modification would be comparable to meddling with the operating system 341. To nevertheless be able to make certain modifications to the first and second system configuration 331, 332 and/or to the basic configuration 333, individual sub-contents could, for example, be provided as library files in the file system.

The selection of the system configuration by the application 342 could also be carried out by an analysis of the subscription data to the mobile communication network in to which the mobile telephone 200 and/or security module 300 can log, for example based on the file system. Alternatively, the application 342 could read out a piece of identification information from the first subscription data of the selected mobile communication network. The activation or switching between the individual system configurations 331, 332 and/or the basic configuration 333 by the switching unit 343 is preferably done by the switching unit 343 setting a link.

Figure 3:
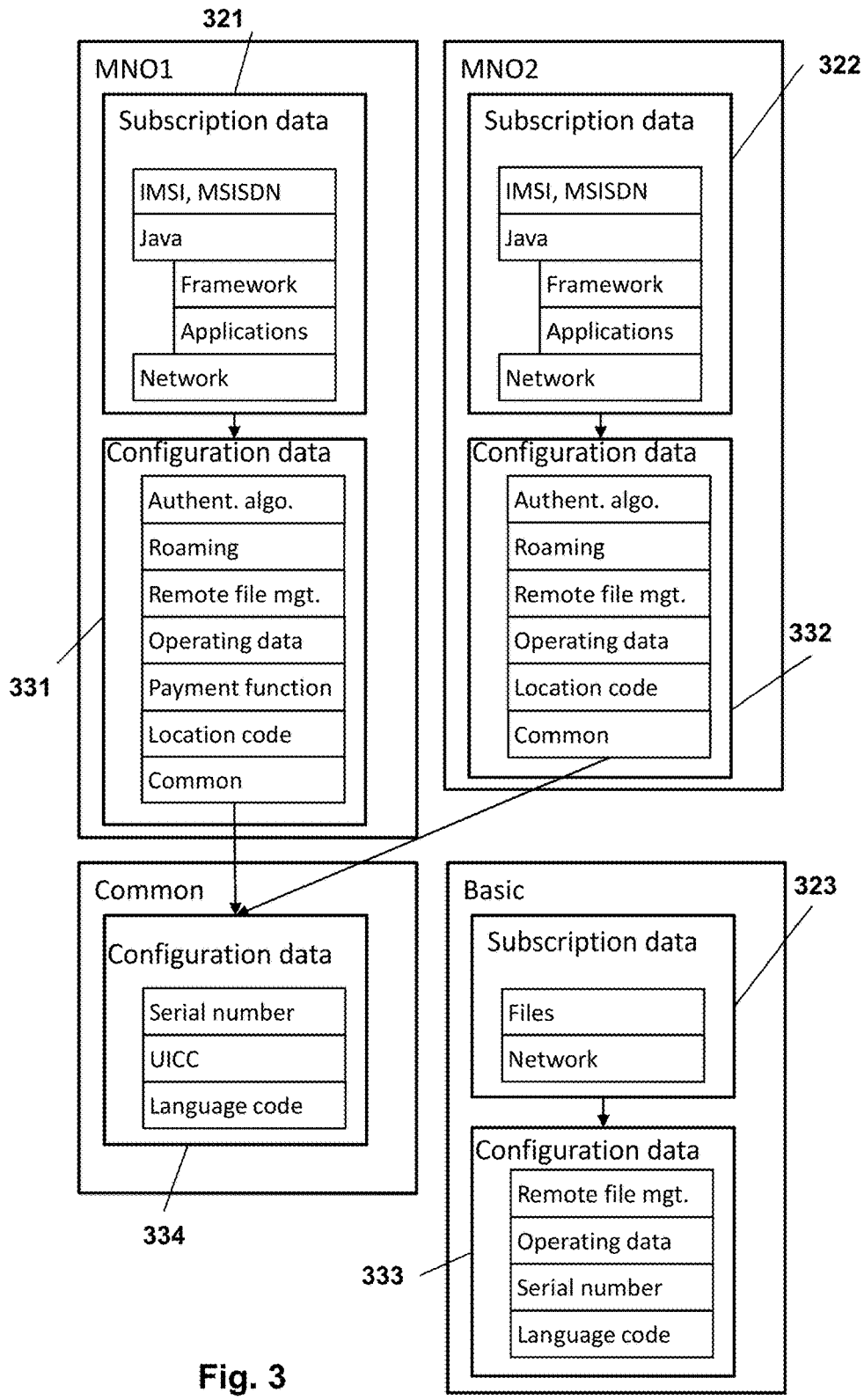
FIG. 3 one possible mapping of subscription data to system configuration.

In FIG. 3 are depicted, by way of example, different subscription profiles for use according to the present invention. A subscription profile comprises subscription data and a system configuration. The subscription data and the system configuration together comprise operator-specific and mobile-communication-network-specific information for logging the mobile telephone in to and for operating the mobile telephone in a certain mobile communication network. The difference between the subscription data and the system configuration consists in the fact that the subscription data can be directly modified by a network operator or a subscription manager. For example, subscription data can be loaded to the security module prior to logging in to the specific mobile communication network. In contrast, the system configuration can normally not be edited by third parties.

For a first mobile communication network of a first operator (mobile network operator—MNO1), the first subscription data 321 (subscription) comprises identification features, for example an IMSI or the mapped mobile telephone number MSISDN. Furthermore, information for accessing the first mobile communication network, for example roaming information or network keys, is specified in the subscription data. Further, settings and permissions concerning JAVA applications or basic JAVA settings, for example the framework, can be included. The contents of the subscription data 321 can be transmitted to the security module over the first mobile communication network by a subscription manager. In particular, it is provided that the contents of the subscription data can be edited, for example by an HLR or the subscription manager.

The first system configuration 331 comprises data that is particularly security-sensitive for the mobile communication network and that includes specific configurations of the security module and/or of the mobile telephone for logging in to and for operating in a certain mobile communication network. In the exemplary embodiment in FIG. 3, the first system configuration 331 comprises an authentication algorithm that is used to authenticate the security module in the first mobile communication network. Further, data for roaming management is stored in the first system configuration 331. Said roaming data can be stored in the security module as an applet so that it is possible to access the roaming applets from the first system configuration 331 by means of a link. Further, permissions for remote file management are specified in the first system configuration 331. Said permissions regulate which instance, person and/or object may access which files.

Further, particular specific operating data is stored in the first system configuration 331. For this, parameters for a payment service are stored. The parameters comprise connection data and access data to bank servers and, if applicable, accounts and/or algorithms for authenticating transactions. In this way, the mobile telephone likewise receives the information whether mobile payment is possible over the mobile telephone 200. Further, operating parameters for setting the transmission and processing the payment data in the mobile communication network is included in the operating data. The first system configuration 331 comprises a location code (LAI; local area information). The location code indicates a local region in which the subscription profile is valid. In this way, it can be determined that the mobile telephone can log in to and operate in the mobile communication network of the first operator only in the specific local region. If the mobile telephone and thus the security module leaves the local region, the security module or the mobile telephone can no longer log into the mobile communication network of the first operator. Operation of the mobile telephone would thus not be possible in said mobile communication network.

As can be seen from FIG. 3, the first subscription profile 331 and the second subscription profile 332 are similarly structured. They differ substantially in their content, such as parameters, and the functions. In the second subscription profile 332, no entries on payment functions are stored. Thus, no particular settings are available for carrying out payment transactions, especially for the connection.

Further, a commonly used region (common) is present on the security module. By way of example, system configuration 334 is stored in the commonly used region. Included in the shared system configuration 334 is a reference to the language codes to be used and a serial number to be used for both the first and second subscription profile. The first system configuration and second system configuration 331, 332 each comprise a link to the commonly used region of the shared system configuration 334. In this way, identical profile-specific entries in the subscription profile that are used by multiple mobile communication networks can be stored compactly on one security module. Simultaneously, simple management of system configurations that are used by multiple subscription profiles is enabled at manufacture.

Said commonly used region can thus comprise comprehensive data and parameters, such as system packages.

Further, a basic subscription profile is located on the SIM card. Said basic subscription profile is not mapped to any specific mobile communication network or mobile network operator. The basic subscription profile serves as a basis for logging in to a third, as yet unknown network and operating the mobile telephone therein. For this, unique identification features can be listed in the subscription data 324. Further, specific information, for example operating data for billing services by the third mobile communication network, a rule on remote file management, or a location code can be included in the associated basic system configuration 323.

As can be seen from the exemplary embodiments depicted in the figures, with the present invention, a subscription profile that is specific to the network operator or the mobile communication network can automatically be provided by the security module. In particular, specific and proprietary functionalities for one or more mobile network operators and mobile communication networks, as well as settings therefor, can be stored and released accordingly. Further, system packages and system parameters can be maintained in a common region, such that different subscription profiles can access identical data or identical datasets. The system configuration is preferably already integrated in the operating system, at least in part. Merely for managing particular parameters, for example the location code or language codes, could their contents be loaded subsequently, for example as a library. Alternatively, parameters could be stored in a region that is accessible to, for example, a subscription manager, an appropriate link to the region being set in the respective system configuration.

The invention claimed is:

1. A method for provisioning a security module of a mobile terminal with a new subscription profile, the security module being configured to communicate over one of a plurality of mobile communication networks, the method comprising the following steps:
   providing a security module configured to communicate over one of a plurality of mobile communication networks, wherein
      the security module has stored in a memory thereon a plurality of system configurations including a different system configuration for each one of the plurality of mobile communication networks,
      each of the system configurations includes network-specific system configurations for logging the security module into the corresponding one of the plurality of mobile communication networks and operating the security module in the corresponding one of the plurality of mobile communication networks, and
      the security module is configured such that the different system configurations stored thereon are inaccessible to a third party;
   receiving in the security module the new subscription profile from a subscription manager over an air interface, the new subscription profile including new subscription data for logging into one mobile communication network of the plurality of mobile communication networks;
   storing the new subscription profile that is received in the security module to the memory in the security module configured to store subscription profiles;
   analyzing the new subscription data by the security module and identifying by the security module the mobile communication network of the plurality of mobile communication networks into which the security module can log by means of the new subscription data;
   selecting by the security module a corresponding one of the different system configurations that is specified for the mobile communication network, based on said analyzing and identifying by the security module of the plurality of mobile communication networks; and
   operating the security module with the selected system configuration in the identified mobile communication network.

2. The method according to claim 1, wherein the new subscription data comprises an IMSI, a network access key, an identification key, a network operator name and/or a string information.

3. The method according to claim 1, wherein the system configuration carries out settings for the communication of the security module and/or of the mobile terminal with the mobile communication network, and/or activates or blocks functions of the security module and/or of the mobile terminal.

4. The method according to claim 1, wherein the step of selecting the system configuration comprises a selecting unit being addressed to activate and/or deactivate system configurations.

5. The method according to claim 4, wherein, to activate the selected system configuration, the selecting unit establishes a link for selecting.

6. The method according to claim 1, wherein when the mobile terminal logs out of the identified mobile communication network, the selected system configuration is deactivated.

7. The method according to claim 1, wherein, to activate the system configuration, the security module decodes, merges and/or decompresses the system configuration.

8. The method according to claim 1, wherein the security module is provided as a hardware security element firmly integrated in the mobile terminal.

9. The method according to claim 1, further comprising logging out of the identified mobile communication network and deactivating the selected system configuration in the identified mobile communication network such that the selected system configuration becomes an inactive system configuration, and
encrypting, zipping, or grouping the inactive system configuration.

10. The method according to claim 1, further comprising logging out of the identified mobile communication network and deactivating the selected system configuration in the identified mobile communication network such that the selected system configuration becomes an inactive system configuration, and
deleting or partially deleting the inactive system configuration.

11. The method according to claim 1, wherein, before receiving the new subscription profile including the new subscription data for logging into the one mobile communication network of the plurality of mobile communication networks, the security module searches for previous subscription data corresponding to the one mobile communication network of the plurality of mobile communication networks and, in the case that the previous subscription data is already stored in the memory, the previous subscription data is deleted.

12. The method according to claim 1, wherein the security module has stored in the memory a basic system configuration, the security module being configured to use the basic system configuration as a standard-conform configuration within a yet unknown mobile communication network.

13. The method according to claim 1, wherein the security module is provided with a central processing unit, the central processing unit having an operating system and said memory, in which the plurality of system configurations are stored.

14. A security module for use in a mobile terminal, the security module being provisionable with a new subscription profile,
wherein the security module comprises:
an interface with which the security module is configured to communicate over one of a plurality of mobile communication networks; and
a memory configured to have stored thereon a plurality of different system configurations including a different system configuration for each one of the plurality of mobile communication networks, each of the different system configurations including network-specific system configurations for logging the security module into the corresponding one of the plurality of mobile communication networks and operating the security module in the corresponding one of the plurality of mobile communication networks, the security module being configured such that the different system configurations stored thereon are inaccessible to a third party;
wherein the memory is further configured to store a new subscription profile that includes new subscription data of the plurality of mobile communication networks, and the new subscription data for logging into one mobile communication network of the plurality of mobile communication networks;
wherein
the security module is configured to receive the new subscription profile from a subscription manager over an air interface;
the memory is configured to store the plurality of system configurations, one system configuration being mapped to one mobile communication network of the plurality of mobile communication networks;
the security module further comprises an analyzing unit configured to analyze the new subscription data for one mobile communication network, of the plurality of mobile communication networks, and identify the mobile communication of the plurality of mobile communication networks into which the security module can log with the help of the new subscription data; and
the security module further comprises a selecting unit for selecting a corresponding one of the different system configurations that is specified for the mobile communication network, based analyzing and identifying by the analyzing unit of the security module of the plurality of mobile communication networks; and
the security module is configured to operate in the identified mobile communication network with the selected system configuration.

15. The security module according to claim 14, wherein the memory for storing the system configurations is a secure memory.

16. The security module according to claim 14, wherein the security module comprises an operating system, and the selecting unit for selecting the system configuration is part of the operating system.

17. The security module according to claim 14, wherein one system configuration of the system configurations is valid for a certain period.

18. The security module according to claim 14, wherein one system configuration of the system configurations is a basic configuration.

19. The security module according to claim 14, wherein a portion of one system configuration is stored in a memory that is usable for another system configuration.

20. The security module according to claim 14, wherein the selecting unit is an application and/or that the analyzing unit is an application and especially is developed as an application for operating the security module in a secure environment.

* * * * *